|  |  |
| --- | --- |
| United States Patent [19] | [11] Patent Number: 4,535,434 |
| Kishi | [45] Date of Patent: Aug. 13, 1985 |

[54] OPTICAL DISC AND DISC DRIVE MECHANISM

[75] Inventor: Yoshio Kishi, Yokohama, Japan

[73] Assignee: Sony Corporation, Tokyo, Japan

[21] Appl. No.: 246,904

[22] Filed: Mar. 23, 1981

[30] Foreign Application Priority Data

Mar. 27, 1980 [JP] Japan .................................. 55-39434

[51] Int. Cl.$^3$ .......................... G11B 7/00; G11B 23/02
[52] U.S. Cl. .................................... 369/111; 360/133; 369/291; 369/266; 369/275; 301/103; 464/29
[58] Field of Search ................... 360/133, 97, 102, 73; 369/111, 291, 266, 270, 271, 273, 275, 274, 269; 358/342; 242/200, 199, 198; 310/104, 103, 105; 464/129; 206/309, 444

[56] References Cited

U.S. PATENT DOCUMENTS

| | | | |
|---|---|---|---|
| 2,485,848 | 10/1949 | Sharp | 464/29 |
| 3,183,385 | 5/1965 | Gabriel | 310/103 |
| 3,430,966 | 3/1969 | Gregg | 369/111 |
| 3,943,275 | 3/1976 | Jebens | 360/102 |
| 4,002,826 | 1/1977 | Semenschot | 369/111 |
| 4,074,282 | 2/1978 | Balos | 358/297 |

FOREIGN PATENT DOCUMENTS 2822899 11/1979 Fed. Rep. of Germany ...... 369/111

OTHER PUBLICATIONS

*Circuits, Devices, and Systems*, by Smith ©1966, pp. 516-518.
Japanese Patent Abstract, 55-4710(A), Fujita, 1/14/80.
"Drive for Hermetically Sealed Disk File", by Treseder, IBM Tech. Disc. Bul., vol. 22, No. 3, Aug. 1979, pp. 1181, 1182.

*Primary Examiner*—Alan Faber
*Attorney, Agent, or Firm*—Hill, Van Santen, Steadman & Simpson

[57] ABSTRACT

An optical disc assembly includes an optical disc on which signals are recorded, and from which the signals are optically reproduced; a closed casing rotatably containing the optical disc, and having a transparent portion; and a rotor fixed at the center of the optical disc and magnetically coupleable with an external rotating magnetic field to be rotated therewith. An optical disc assembly includes a rotating magnetic field generating device arranged outside of the closed casing and concentrically with the optical disc to drive the latter without contact.

4 Claims, 9 Drawing Figures

OPTICAL DISC AND DISC DRIVE MECHANISM

BACKGROUND OF THE INVENTION

1. Field of the Invention

This invention relates to an optical disc assembly in which an audio signal, a video signal, a data processing signal or any other signal is recorded, and in which the signal is reproduced with light such as laser, and a disc drive machine for driving the optical disc.

2. Description of the Prior Art

FIG. 1 and FIG. 3 show conventional optical discs 1 and 2 on which an audio signal or a video signal is recorded to be optically read out. The optical disc 1 of FIG. 1 is single-sided. The optical disc 2 of FIG. 3 is double-sided. FIG. 2 is an enlarged view of a portion of the optical disc 1 of FIG. 1. In FIG. 1 and FIG. 2, a main body is made of transparent material such as glass or plastics which is about 1.1 mm in thickness. A spiral track 3 is formed on one side surface of the main body. Signal indentations 4 are formed with high density in the spiral track 3, which are about $0.2\mu$ in depth. They may be formed by a press as a usual record disc. A reflecting film 5 is formed on the spiral track 3 for example by vapor deposition of aluminum. Further, a protecting film 6, such as a plastic film, is formed on the reflecting film 5 in order to protect the signal indentations 4.

When the signal is reproduced from the optical disc 1, the recorded spiral track 3 of the rotating optical disc 1 is transmitted through an objective lens 8 by laser light 7. The signal indentations 4 are optically read out by the reflecting laser light from the reflecting film 5, without any physical contact with the disc.

The two-sided optical disc 2 of FIG. 3 is obtained by attaching two optical discs 1 to each other back to back.

Basically, the conventional optical disc is one-sided. Two optical discs should be attached to each other to obtain a two-sided optical disc. The protecting film 6 is always formed on the recorded spiral track 3 in order to prevent the very fine signal indentation 4 (about $0.2\mu$ in depth) from being touched directly by the user, and the recorded spiral track 3 damaged by deposition of dust. Accordingly, the conventional optical disc is inconvenient for mass production and subject to easy damage.

SUMMARY OF THE INVENTION

An object of this invention is to provide an optical disc assembly in which the optical disc can be prevented from damage and dust deposition.

Another object of this invention is to provide an optical disc assembly in which no protecting film is required for the optical disc.

A further object of this invention is to provide an optical disc assembly which is convenient for mass production.

A still further object of this invention is to provide an optical disc drive mechanism which can drive the optical disc of the above-described optical disc assembly without contact.

In accordance with an aspect of this invention, an optical disc assembly includes (A) an optical disc on which signals are recorded, and from which the signals are optically reproduced; (B) a closed casing rotatably containing the optical disc, and having a transparent portion; and (C) a rotor fixed coaxially on the center of the optical disc, and magnetically coupleable with an external rotating magnetic field to be rotated thereby.

In accordance with another aspect of this invention, an optical disc drive mechanism is provided for driving the optical disc of an optical disc assembly which includes a closed casing rotatably containing the optical disc, and which has a transparent portion, and a rotor fixed on the center of the optical disc, and magnetically coupleable with an external rotating magnetic field to be rotated therewith. The optical disc drive mechanism includes a rotating magnetic field generating device arranged outside of the closed casing and concentrically with the optical disc, whereby the rotor is magnetically coupled with the rotating magnetic field of the rotating magnetic field generating device to be driven without contact.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

An optical disc assembly according to a first embodiment of this invention will be described with reference to FIG. 4 through FIG. 6.

Figure 1:
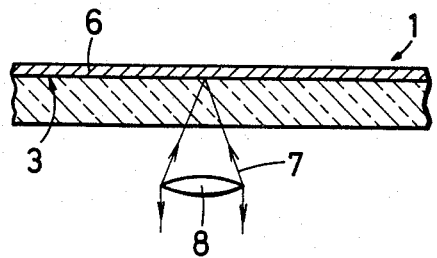
FIG. 1 is a cross-sectional view of a part of a conventional optical disc.
Figure 2:
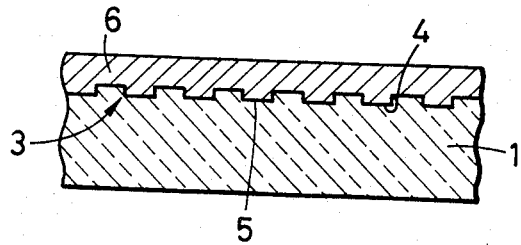
FIG. 2 is an enlarged cross-sectional view of a part of the optical disc of FIG. 1.
Figure 3:
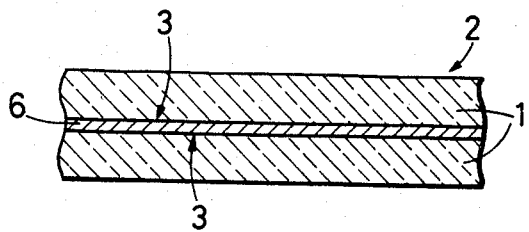
FIG. 3 is a cross-sectional view of a part of another conventional optical disc.
Figure 4:
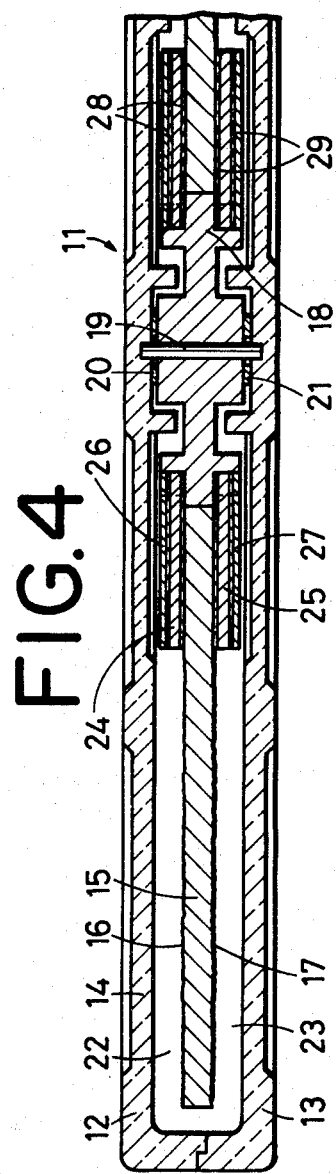
FIG. 4 is a cross-sectional view of a part of an optical disc assembly according to a first embodiment of this invention.

Referring to FIG. 4, an optical disc assembly 11 includes a closed casing 14 which consists of upper and lower halves 12 and 13 preferably made of plastic. The closed casing 14 contains an optical disc 15 which is made of glass, plastics or metal. Recorded surfaces 16 and 17 may be formed on both sides of the optical disc 15. An audio signal, a video signal or a data processing signal is recorded with high density on the recorded surfaces 16, as depressions or cut-outs of a recording film in the spiral form or in the form of concentric circles. The optical disc 15 does not need to be transparent. It may be opaque. It is not required at all that protecting films are formed on the recorded surfaces 16 and 17. The optical disc 15 is preferably used in the condition that the recorded surfaces 16 and 17 are uncovered.

A disc supporter 18 is combined with the center of the optical disc 15. A support shaft 19 passes through the center of the disc supporter 18, and it is fixed on the closed casing 14. Thus, the disc 15 is rotatably supported in the closed casing 14. Thrust washers 20 and 21 are interposed between the disc supporter 18 and the inner walls of the casing 14 around the support shaft 19. Predetermined clearances 22 and 23 are formed between the recorded surfaces 16 and 17, and the inner walls of the closed casing 14 by the interposed thrust washers 20 and 21. The optical disc 15 rotates under the predetermined clearances 22 and 23.

A rotor consisting of a pair of hysteresis discs 24 and 25, and a pair of eddy current discs 26 and 27 is fixed on the central portion of the optical disc 15 by adhesives 28 and 29. The hysteresis discs 24 and 25 are made of magnetic material. It is not always required to combine the hysteresis discs 24 and 25, and the eddy current discs 26 and 27. Either the hysteresis discs 24 and 25, or the eddy current discs 26 and 27 may solely be used as the rotor. Further, it is not necessary that the hysteresis discs 24 and 25, and the eddy current discs 26 and 27 be attached to both sides of the optical disc 15. Either the hysteresis disc 24 or 25, or eddy current disc 26 or 27 may be attached to one side of the optical disc 15. The discs 24, 25, 26, and 27 may be embedded in the optical disc 15 or they may be formed integrally with the optical disc 15 by an insert-molding method.

The rotor is magnetically coupled with an external rotating magnetic field so as to be rotated, as described hereinafter.

According this embodiment, the optical disc 15 is rotatably contained in the closed casing 14. Accordingly, the recorded surfaces 16 and 17 are not touched directly by the user, and dust can be prevented from depositing. Protecting films do not need to be formed on the recorded surfaces 16 and 17 and the recorded surfaces 16 and 17 are accordingly used in the naked condition. The recorded surfaces 16 and 17 can be formed on both sides of the optical disc 15 at the same time. Accordingly, the structure of this embodiment is very convenient for mass-production.

The recorded surfaces 16 and 17 of the disc 15 are preferably read out by irradiation of laser light as described hereinafter. For this purpose only a portion of the casing 14 consisting of the upper and lower halves 12 and 13 needs to be transparent. For example, a portion along the radius of the disc 15 may be transparent in the upper and lower halves 12 and 13.

Figure 5:
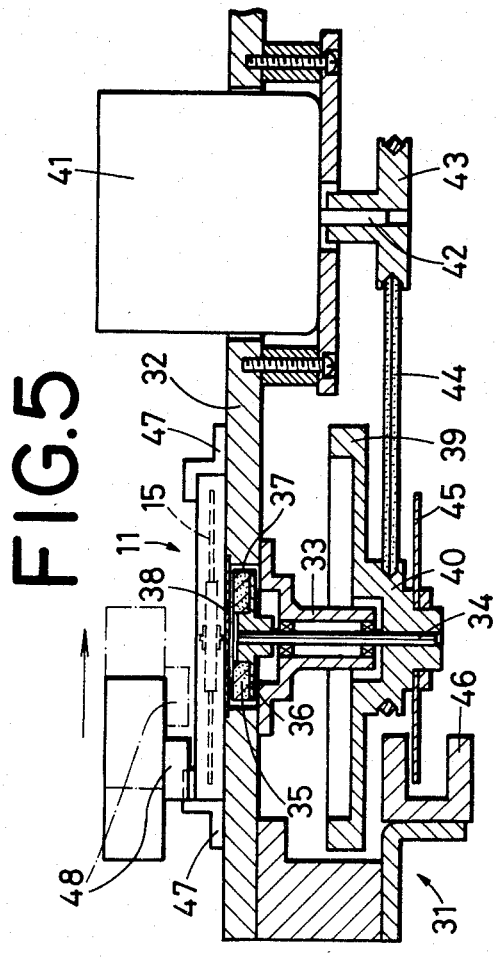
FIG. 5 is a cross-sectional view of an optical disc drive mechanism for driving the optical disc of the optical disc assembly of FIG. 4.
Figure 6:
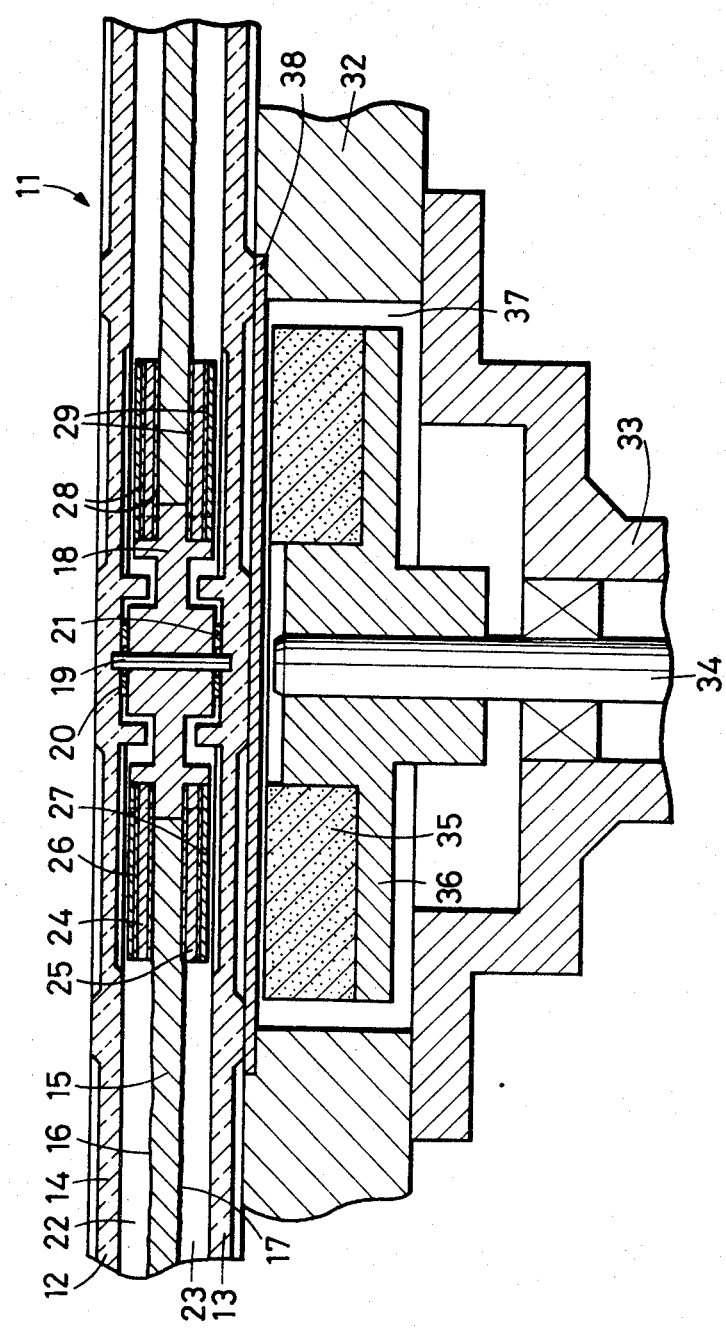
FIG. 6 is an enlarged cross-sectional view of an important part of the optical disc drive mechanism of FIG. 5.

FIG. 5 and FIG. 6 show a disc drive apparatus 31 for driving the disc 15 of the optical disc assembly 11 of FIG. 4.

Referring to FIG. 5 and FIG. 6, a bearing block 33 is fixed on a lower surface of a chassis 32 for mounting the optical disc assembly 11. A vertical shaft 34 is rotatably supported by the bearing block 33. A rotary permanent magnet 35 is fixed through a magnet mounting plate 36 on the upper end of the vertical shaft 34. A rotating magnetic field is generated by rotation of the permanent magnet 35 which is positioned in an opening 37 formed in the chassis 32. The upper surface of the permanent magnet 35 is positioned close to the upper surface of the chassis 32 as shown in FIG. 5. The opening 37 is covered with a protecting plate 38 made of thin non-magnetic material. Thus, the rotary permanent magnet 35 is enclosed by the protecting plate 38 and the bearing block 33, and it is prevented from unexpectedly depositing iron powder. The rotary permanent magnet 35 is so magnetized that the N- and S-poles are alternately arranged in the rotational direction.

A flywheel 39 is fixed on the lower end of the rotary shaft 34. A pulley 40 is formed integrally with the flywheel 39. Another pulley 43 is fixed on a rotary shaft 42 of an electric motor 41. A belt 44 is wound on the pulleys 40 and 43. Accordingly, the permanent magnet 35 is driven by the rotational force of the electric motor 41 and the rotating magnetic field is generated.

A rotary disc 45 having numerous radial slits is fixed on the lower end of the rotary shaft 34. A photocoupler 46 is fixed on the chassis 32 so as to optically detect the rotational speed of the rotary disc 45. A frequency detector is constituted by the rotary disc 45 and the photo-coupler 46. The rotational speed of the electric motor 41 is controlled by the frequency detector. Thus, the rotary magnet 35 is rotated at a constant speed.

The optical disc assembly 11, as a disc cassette, is positioned in the chassis 32 by a cassette positioning member 47 so that the rotational center of the disc 15 in the closed casing 14 is exactly aligned with the center of the rotary shaft 34. The rotary magnet 35 is concentric with hysteresis discs 24 and 25, and the eddy current discs 26 and 27, and is close to them.

As noted above, the rotary magnet 35 is rotated at the desired constant speed by the electric motor 41. Rotating magnetic field is generated by the rotary magnet 35. The rotary magnet 35 is coupled through the rotating magnetic field with the hysteresis discs 24 and 25, and the eddy current discs 26 and 27. Thus, the optical disc 15 is rotated in synchronization with the rotary magnet 35 without contact. The rotational force to the optical disc 15 is caused by hysteresis loss of the hysteresis discs 26 and 27. One of hysteresis loss and eddy current loss may be used for obtaining the rotational force to the optical disc 15. When hysteresis loss is used, the eddy current discs 26 and 27 may be omitted. When eddy current loss is used, the hysteresis discs 24 and 25 may be omitted.

An objective lens 48 is arranged above the optical disc assembly or cassette 11 mounted on the chassis 32, and is continuously moved at a predetermined speed in parallel with the optical disc 15 and along the radius of the optical disc 15. Laser light is passed through the objective lens 48 and the transparent portion of the casing 14 onto the recorded surface 16 or 17 of the optical disc 15. The signal pits or depressions on the recorded surface 16 or 17 of the optical disc 15 are optically read out by the reflecting light which passes through the transparent portion of the closed casing 14.

Figure 7:
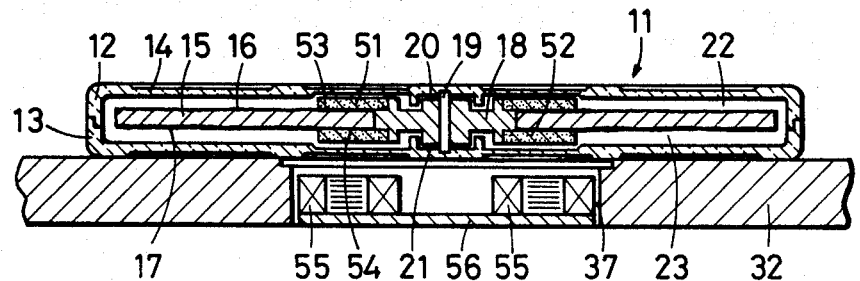
FIG. 7 is a cross-sectional view of an optical disc assembly according to a second embodiment of this invention, and an optical disc drive mechanism for driving the optical disc of the optical disc assembly.

Next, an optical disc assembly 11' according to a second embodiment of this invention will be described with reference to FIG. 7. Parts in FIG. 7 which correspond to those in the first embodiment, are denoted by the same reference numerals, the description of which will be omitted.

In this embodiment, permanent magnetic rings 51 and 52 are fixed on the upper and lower surfaces of the central portion of the optical disc 15 with adhesives 53 and 54. The permanent magnetic rings 51 and 52 are so magnetized that N-poles and S-poles are alternately arranged in the rotational direction. In a disc drive apparatus for driving the disc 15 of the optical disc assembly 11', plural coils 55 are so arranged in circle in the opening 37 of the chassis 32 that the circle is concentric with the permanent magnet rings 51 and 52. The plural coils 55 are mounted on a printed board 56 which is fixed on the chassis 32.

The coils 55 are energized and deenergized in turn so as to generate rotating magnetic field. The permanent magnetic rings 51 and 52 are rotated with the rotating magnetic field. Thus, the optical disc 15 is driven without contact.

Figure 8A:
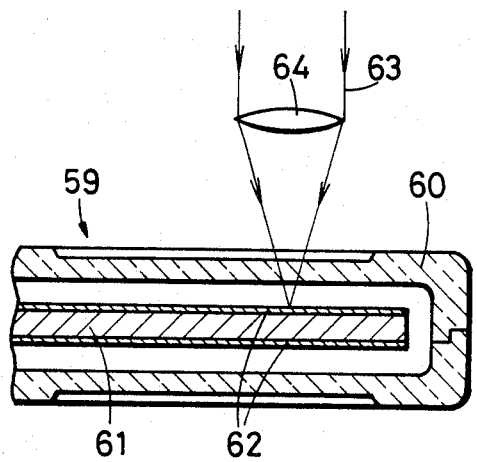
FIG. 8A and FIG. 8B are cross-sectional views of a part of an optical disc assembly according to a third embodiment of this invention.
Figure 8B:
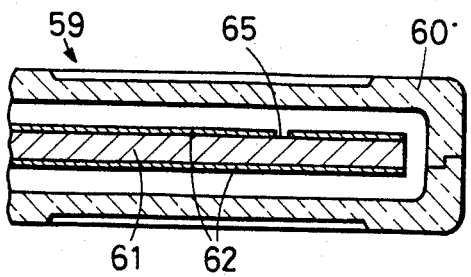

FIG. 8A and FIG. 8B show an optical disc assembly 59 according to a third embodiment of this invention. Signals can be optically recorded in a recording film 62 formed on an optical disc body 61 according to this embodiment. A closed casing 60 may be equal to the closed casing 14 of the first embodiment. A disc drive apparatus for driving the optical disc body 61 may be the same as the disc drive apparatus described for the first or second embodiment. The disc body 61 is preferably made of glass.

The recording film 62 is preferably made of a bismuth (Bi) metal compound such as arsenic-tellurium (As-Te), or photo-chemical organic material and may be formed on the optical disc body 62 by a coating method, a bonding method, or a depositing method.

According to this embodiment, signals can be easily recorded on the recording film 62 in the manner that laser light 63 is spot radiated through an objective lens 64 and the closed casing 60 from the outside, as shown in FIG. 8A. As shown in FIG. 8B, the recording film 62 is partially evaporated by spot-like irradiation of laser light to form a pit 65 as record information.

In the recording operation described, poisonous gas is produced from the recording film 62. However, since the casing 60 is tightly closed, the gas can not leak out from the casing 60. If the recording film 62 were touched by hand, the recorded information would be damaged. However, since the casing 60 is closed, such fear is avoided.

While the preferred embodiments have been described, variations thereto will occur to those skilled in the art within the scope of the present inventive concepts which are delineated by the following claims.

What is claimed is:

1. A combination of an optical disc assembly and an optical disc drive mechanism comprising: a closed non-rotating cassette casing having a transparent portion, means mounting said disc rotatably in said casing, a rotor fixed on the center of said optical disc in said casing, and comprising material magnetically influenceable to rotate the disc therewith, and rotating magnetic field generating means arranged outside of said closed casing and closely adjacent thereto, and means precisely positioning said casing relative to said field generating means to cause said field generating means to rotate concentrically with said optical disc, whereby said rotor is magnetically coupled with the rotating magnetic field of said rotating magnetic field generating means to be driven thereby past said transparent portion without contact.

2. An optical disc drive mechanism according to claim 1, in which said rotating magnetic field generating means comprises plural fixed coils mounted in an annular configuration and energized and deenergized in turn.

3. An optical disc drive mechanism according to claim 1, in which said rotating magnetic field generating means is covered with a non-magnetic plate.

4. A radiation-sensitive record cartridge comprising:
a disc-shaped member having a radiation-sensitive recording layer on at least one planar side thereof;
an enclosure spaced from and completely surrounding said disc-shaped member;
means for supporting said disc-shaped member within said enclosure and for enabling rotation of said disc-shaped member around an axis extending through the center of and perpendicular to the plane of said disc-shaped member;
means for coupling said disc-shaped member to drive means which is outside said enclosure, said coupling means comprising a magnetically influenceable means attached to said disc-shaped member and rotatable magnetic drive means situated outside said enclosure which generates a magnetic field for interaction with said magnetically influenceable means;
means for aligning said enclosure and the disc shaped member therein with the said disc shaped member and said drive means in coaxial condition; and
means in said enclosure for allowing access to the radiation-sensitive layer on said disc-shaped member so that information is recorded on and read from said disc-shaped member through said access allowing means.

* * * * *